United States Patent
Koyanagi et al.

(10) Patent No.: US 8,728,229 B2
(45) Date of Patent: May 20, 2014

(54) CEMENT SLURRY COMPOSITION

(75) Inventors: Koji Koyanagi, Wakayama (JP);
Toshiharu Kojima, Wakayama (JP);
Hotaka Yamamuro, Wakayama (JP)

(73) Assignee: Kao Corporation, Tokyo (JP)

( * ) Notice: Subject to any disclaimer, the term of this patent is extended or adjusted under 35 U.S.C. 154(b) by 127 days.

(21) Appl. No.: 13/256,602

(22) PCT Filed: Jun. 11, 2009

(86) PCT No.: PCT/JP2009/061139
§ 371 (c)(1),
(2), (4) Date: Sep. 14, 2011

(87) PCT Pub. No.: WO2010/143312
PCT Pub. Date: Dec. 16, 2010

(65) Prior Publication Data
US 2012/0000397 A1  Jan. 5, 2012

(51) Int. Cl.
*C04B 24/04* (2006.01)

(52) U.S. Cl.
USPC ........... 106/696; 106/724; 106/725; 106/728; 106/819; 106/823; 166/292; 166/293

(58) Field of Classification Search
USPC .......... 106/696, 724, 819, 823; 166/292, 293
See application file for complete search history.

(56) References Cited

U.S. PATENT DOCUMENTS

| | | | |
|---|---|---|---|
| 5,232,497 A * | 8/1993 | Dillenbeck et al. | 106/727 |
| 7,229,492 B2 * | 6/2007 | Chatterji et al. | 106/724 |
| 7,374,699 B2 * | 5/2008 | Yamamuro et al. | 252/183.13 |
| 2003/0200901 A1 * | 10/2003 | Yamamuro et al. | 106/724 |

FOREIGN PATENT DOCUMENTS

| | | |
|---|---|---|
| EP | 1 266 875 A2 | 12/2002 |
| HK | 2004-124007 A | 4/2004 |
| JP | 6-42281 A | 2/1994 |
| JP | 9-13034 A | 1/1997 |
| JP | 10-36825 A | 2/1998 |
| JP | 2003-261860 A | 9/2003 |
| JP | 2003-313536 A | 11/2003 |
| JP | 2003-313537 A | 11/2003 |
| JP | 2004-91217 A | 3/2004 |
| JP | 2008-230914 A | 10/2006 |
| JP | 2007-99561 A | 4/2007 |
| JP | 2009-161373 A | 7/2009 |

OTHER PUBLICATIONS

Notice of Grounds for Rejection for corresponding Japanese Patent Application No. 2007-340231, mailed on Dec. 20, 2011.
Computer English translation of JP-2003-261860-A dated Sep. 19, 2003.
Computer English translation of JP-2008-230914-A dated Oct. 2, 2008.
Computer English translation of JP-2009-161373-A dated Jul. 23, 2009.
International Search Report for PCT/JP2009/061139 dated Feb. 23, 2010.

* cited by examiner

*Primary Examiner* — Paul Marcantoni
(74) *Attorney, Agent, or Firm* — Birch, Stewart, Kolasch & Birch, LLP

(57) ABSTRACT

The present invention provides a cement slurry composition, containing a hydraulic cement material, (A) a first water-soluble low molecular weight compound and (B) a second water-soluble low molecular weight compound differing from the compound (A), wherein a combination of the compounds (A) and (B) is (I) the compound (A) selected from cationic surfactants and the compound (B) selected from anionic aromatic compounds; or (II) the compound (A) selected from cationic surfactants and the compound (B) selected from brominated compounds, and in the compound (A), a ratio of compounds having a hydrocarbon group of 18 or more carbon atoms is not less than 45% by weight.

20 Claims, No Drawings

CEMENT SLURRY COMPOSITION

FIELD OF THE INVENTION

The present invention relates to a cement slurry composition suitably used for well and the like.

BACKGROUND OF THE INVENTION

In drilling an oil well, a natural gas well, and a geothermal well, materials are used to cement an annular cavity between a stratum and a casing pipe, which are so-called a cement slurry composition for well. In general, a cement slurry is fed into an annular cavity between a casing pipe and a stratum with a pump via the casing pipe from the ground. The annular cavity is filled with the cement slurry upward from the bottom thereof. The casing piper is fixed in the well with the hardened cement slurry, and thereby the inner wall of the well is protected.

Conventional cement slurry compositions for well used to cement a well have contained various additives. Examples of the additive include a cement accelerator, a cement retarder, a dispersant, a cement dehydration-reducing agent, a low-density additive, a high-density additive, an expanding agent, a cement strength stabilizer and a silica powder. These are used in combination according to well conditions and a purpose.

In cementing a well, a defect easily occurs in a cemented part by material segregation and running into cracks in the well. To address this, walnut shells, cotton seeds, clay minerals, and polymer compounds and the like have conventionally been added. JP-A10-36825 discloses a cement slurry for geothermal well containing a pulverized portland cement and a specific finely powdered silicaceous admixture. JP-A06-42281 discloses a method of preventing water leakage with a specific cement slurry to which a retarder such as a boron compound and a lignosulphonic acid derivative is added. JP-A09-13034 discloses a specific cement slurry composition for well containing a cement, β-1,3-glucan, a dispersant, and an antifoaming agent. JP-A2003-313537 discloses a slurry without diluting in water, containing a slurry rheology modifier prepared with specific compounds (A) and (B).

Further, JP-A 2004-124007 discloses a slurry rheology modifier of a single agent type. U.S. Pat. No. 7,374,699 discloses a slurry rheology modifier which is a combination of two kinds of water-soluble low molecular weight compound.

SUMMARY OF THE INVENTION

The present invention relates to a cement slurry composition, containing a hydraulic cement material, (A) a first water-soluble low molecular weight compound, and (B) a second water-soluble low molecular weight compound differing from the compound (A), wherein a combination of the compounds (A) and (B) is (I) the compound (A) selected from cationic surfactants and the compound (B) selected from anionic aromatic compounds; or (II) the compound (A) selected from cationic surfactants and the compound (B) selected from brominated compounds, and in the compound (A), a ratio of compounds having a hydrocarbon group of 18 or more carbon atoms is not less than 45% by weight.

The present invention also relates to a method of cementing a well by using the cement slurry composition of the present invention as a cement slurry composition for filling and fixing an annular cavity between a stratum and a casing pipe with a cement material in drilling a well.

The present invention also relates to use of the above-mentioned cement slurry composition for drilling a well or a method of cementing a well in drilling a well.

The present invention also relates to a rheology modifier for cement slurry, containing (A) a first water-soluble low molecular weight compound and (B) a second water-soluble low molecular weight compound differing from the compound (A), wherein a combination of the compounds (A) and (B) is (I) the compound (A) selected from cationic surfactants and the compound (B) selected from anionic aromatic compounds; or (II) the compound (A) selected from cationic surfactants and the compound (B) selected from brominated compounds, and, in the compound (A), a ratio of compounds having a hydrocarbon group of 18 or more carbon atoms is not less than 45% by weight.

DETAILED DESCRIPTION OF THE INVENTION

However, a temperature in a drilled hole is higher than normal temperature, and a cement slurry composition for well used in conventional conditions is required to be further improved in segregation resistance and prevention of running into cracks and the like.

The present invention provides a cement slurry composition having a good segregation resistance and fluidity at a high temperature and being prevented from running into cracks and the like.

According to the present invention, a cement slurry composition is provided, having a good fluidity at a high temperature, being highly effective for reducing segregation, an excellent segregation resistance at a high temperature, an excellent viscoelasticity and an excellent filling, being prevented from running into cracks and the like. It is suitable as a cement slurry composition for a well.

The cement slurry composition of the present invention is easy to be fed with a pump due to its good fluidity, and shows characteristic behavior as hardly running into cracks and the like due to its specific elasticity. These characteristics provide advantageous effects for a cement slurry composition for well. It is considered that, in an aqueous phase of the cement slurry composition of the present invention, low molecular weight compounds form a thread-like micelle as a high conformation and then the thread-like micelles aggregate to increase a viscosity of the whole slurry. It is further thought that rheological characteristics of high viscoelasticity of the thread-like micelle are caused by entanglement among thread-like micelle aggregates in the aqueous phase of the slurry to form three-dimensional network of aggregates. These characteristics enables the slurry according to the present invention to be used for feeding and filling a target part in which water exists, because powder particles in the slurry are covered in the aggregate network of thread-like micelles having high viscoelasticity and not diluted. Further, formation of the aggregate network by molecular association in the slurry provides high viscosity to the slurry. In a usual water-soluble polymer linking via covalent bond, when a bond is broken by shearing force such as by stirring, it cannot be recovered. In contrast, the aggregate network is a large structure formed by molecular association via intermolecular force, and it would appear that the aggregate broken by shearing force can easily rebond, reintegrate, and reconstruct an original form. In the present invention, the compound (A) contains compounds having a hydrocarbon group of 18 or more carbon atoms in an amount of not less than 45% by weight and provides good segregation resistance at high temperature. In filling, feeding, and pumping through, the characteristics significantly reduces the viscosity of the cement slurry composition, because of break of the aggregates, making the operations easy. When the operations have finished, stresses of the operations are removed, re-aggregation of broken aggregates takes place and an adequate viscosity is recovered in the slurry. A material segregation resistance is imparted to a slurry at a high temperature. It is sufficiently prevented from running into cracks and the like.

Examples of a cement material used in the present invention include portland cement, mixed cement, high-temperature-use cement, or hydraulic cement containing silica and gypsum. Any cement conventionally used in a cement slurry for a well and the like can be used. The hydraulic cement generally contains calcium, aluminium, iron, magnesium, and/or a compound such as sulfur, and solidifies by reacting with water. Examples of the hydraulic cement include, but not limited to, normal portland cement, high-temperature-use cement, geothermal well cement, oil well cement, quick hardening and super-quick hardening cements, alumina cement, blast furnace cement and portland cement containing fly ash or pozzolan ash.

In the cement slurry composition of the present invention, the first water-soluble low molecular weight compound (molecular weight: not more than 1000) (hereinafter, referred to as the compound (A)) and the second water-soluble low molecular weight compound differing from the compound (A) (molecular weight: not more than 1000) (hereinafter, referred to as the compound (B)) are used in the specific combination (I) or (II). The compounds (A) and (B) form an aggregate structure such as thread-like micelles in the composition, and thereby exhibit the effects.

(I) A combination of the compound (A) selected from cationic surfactants and the compound (B) selected from anionic aromatic compounds (II) A combination of the compound (A) selected from cationic surfactants and the compound (B) selected from bromide compounds The cationic surfactant used as the compound (A) is preferably a quaternary salt, and preferably has at least one saturated or unsaturated linear or branched alkyl group of 10 to 26 carbon atoms. Examples of the cationic surfactant include alkyl having 10 to 26 carbon atoms-trimethylammonium salts, alkyl having 10 to 26 carbon atoms-pyridinium salts, alkyl having 10 to 26 carbon atoms-imidazolinium salts and alkyl having 10 to 26 carbon atoms-dimethylbenzylammonium salts.

The quaternary salt compound preferably has 10 to 26 carbon atoms. From the viewpoint of fluidity at a high temperature, the segregation-reducing effect and prevention from running into cracks, the carbon atom number is more preferably 16 to 26, even more preferably 18 to 26, even more preferably 18 to 24. Further, a cationic surfactant having behenyl group is even more preferable.

Specific examples thereof include hexadecyltrimethylammonium bromide, hexadecyltrimethylammonium methosulfate, hexadecyldimethylethylammonium ethosulfate, a hexadecyldimethylhydroxyethylammonium salt, tallow trimethylammonium chloride, tallow trimethylammonium bromide, tallow trimethylammonium methosulfate, tallow dimethylethylammonium ethosulfate, a tallow dimethylhydroxyethylammonium salt, hydrogenated tallow trimethylammonium chloride, hydrogenated tallow trimethylammonium bromide, hydrogenated tallow trimethylammonium methosulfate, hydrogenated tallow dimethylethylammonium ethosulfate, a hydrogenated tallow dimethylhydroxyethylammonium salt, octadecyltrimethylammonium chloride, octadecyltrimethylammonium bromide, octadecyltrimethylammonium methosulfate, octadecyldimethylethylammonium ethosulfate, octadecylethyldimethylammonium chloride, octadecylethyldimethylammonium bromide, an octadecyldimethyl hydroxyethylammonium salt, behenyltrimethylammonium chloride, behenyltrimethylammonium bromide, behenylethyldimethylammonium chloride, behenylethyldimethylammonium bromide, a behenyldimethylhydroxyethylammonium salt. These may be used in combination of two or more. From the points of water-solubility and thickening effect, particularly preferred are hexadecyltrimethylammonium chloride, octadecyltrimethylammonium chloride, behenyltrimethylammonium chloride and the like.

The cationic surfactant as the compound (A) includes octadecyl trimethyl ammonium methosulfate, octadecyldimethyl ethyl ammonium ethosulfate and octadecyl dimethyl hydroxyethyl ammonium salt.

In the present invention, a content of compounds having a hydrocarbon group of 18 or more carbon atoms in the compound (A) (hereinafter, also referred to as $C_{18}$ rate) is not less than 45% by weight. This range is required to keep high viscosity of a slurry at high temperature, e.g., 40° C. or higher or 80° C. or higher.

The $C_{18}$ rate of the compound (A) is preferably not less than 60% by weight, more preferably not less than 70% by weight, even more preferably not less than 80% by weight. Accordingly, a cationic surfactant having a hydrocarbon group of less than 18 carbon atoms selected from those exemplified above has a limitation of amount used as satisfying the $C_{18}$ rate described above.

A ratio of compounds having a hydrocarbon group 22 or more carbon atoms in above-mentioned compound (A) is preferably 40% by weight or more.

Examples of the anionic aromatic compound used as the compound (B) include carboxylic acids and salts thereof, phosphonic acids and salts thereof, and sulfonic acids and salts thereof, which have an aromatic ring. Specific examples thereof include salicylic acid, p-toluenesulfonic acid, sulfosalicylic acid, benzoic acid, m-sulfobenzoic acid, p-sulfobenzoic acid, 4-sulfophthalic acid, 5-sulfoisophthalic acid, p-phenolsulfonic acid, m-xylene-4-sulfonic acid, cumenesulfonic acid, methylsalicylic acid, styrenesulfonic acid, and chlorobenzoic acid. These may form a salt, and may be used in combination of two or more. If it is a polymer, it preferably has a weight average molecular weight of less than 500 (e.g., according to gel permeation chromatography/polyethylene oxide standard).

In the combination (I), a preferred combination of the compounds (A) and (B) is of an alkyl having 10 to 26 carbon atoms-trimethylammonium salt (where a $C_{18}$ rate is not less than 45% by weight) and a salt of sulfonic acid having an aromatic ring. Such a combination exhibits the effects even when an effective concentration thereof in the aqueous phase of the slurry composition is not more than 5% by weight. Further, from the point of not causing a delayed hardening, the compound (B) is preferably toluenesulfonic acid, xylenesulfonic acid, cumensulfonic acid, styrenesulfonic acid, or a salt thereof, and more preferably p-toluenesulfonic acid or a salt thereof.

Examples of the bromide compound used as the compound (B) include inorganic salts such as sodium bromide, potassium bromide, and hydrogen bromide.

In production of the cement slurry composition of the present invention, the compound (A) and the compound (B) may be separately added to composition materials, or formulated into a single agent (e.g., a single liquid or a powder) to be added to the materials.

The cement slurry composition of the present invention preferably contains the compound (A) in an amount of 0.1 to 3% by weight, more preferably 0.3 to 1.5% by weight, and even more preferably 0.6 to 1.2% by weight in the aqueous phase of the slurry. The cement slurry composition also preferably contains the compound (B) in an amount of 0.1 to 2.5% by weight, more preferably 0.2 to 1.3% by weight, and even more preferably 0.4 to 1% by weight in the aqueous phase of the slurry. These ranges are more preferably applied to a cement slurry composition for well.

In the present invention, a molar ratio (in effective components) of the compound (A) to the compound (B) can be determined considering with an intended viscosity and the like of the cement slurry composition. From the points of the resultant viscosity and form of the aggregate, the compound (A)/the compound (B) is 1/20 to 20/1, preferably 1/20 to 4/1, more preferably 1/3 to 2/1, and even more preferably 1/1 to 2/3. These ranges are more preferably applied to a cement slurry composition for well.

The cement slurry composition of the present invention preferably has a viscosity at 60° C. of 500 to 10000 mPa·s, more preferably 1000 to 10000 mPa·s, and even more preferably 2500 to 10000 mPa·s. These ranges are more preferably applied to a cement slurry composition for well.

In the present invention, an existing water-soluble polymer other than the compounds (A) and (B) can be further used. Examples of the other existing water-soluble polymer include cellulose derivatives, polyacrylic polymers, ethylene oxide polymers, polyvinyl alcohols, gum-based polysaccharides, microorganism-fermented polysaccharides, xanthan gum, and cationic polymers.

From the points of specific gravity of the slurry and strength of a hardened product, the cement slurry composition of the present invention preferably has a water/cement ratio (W/C) of 40 to 130% by weight, more preferably 50 to 100% by weight, and even more preferably 60 to 80% by weight. These ranges are more preferably applied to a cement slurry composition for well.

The cement slurry composition of the present invention can contain a dispersant, a retardant or an antifoaming agent. Any dispersant, any retardant and any antifoaming agent used in a cement slurry composition for well can be selected respectively.

The cement slurry composition of the present invention preferably contains a dispersant.

Examples of the dispersant include anionic polymers such as naphthalenesulfonic acid-formaldehyde condensate, melaminesulfonic acid-formalin condensate, polycarboxylic acid polymer, lignin sulfonic acid salt or derivative thereof or phospate ester polymers. Among them, preferred are polycarboxylic acid polymers. The dispersant is preferably used in an amount of 0.05 to 2% by weight and more preferably 0.2 to 1% by weight to the hydraulic cement material. These ranges are more preferably applied to a cement slurry composition for well.

Examples of the retardant include oxycarboxylic acids and salts thereof and saccharides such as monosaccharide and polysaccharide. Among them, preferred are saccharides. The retardant is preferably used in an amount of 0.005 to 1% by weight, and more preferably 0.02 to 0.3% by weight to the hydraulic cement material. These ranges are more preferably applied to a cement slurry composition for well.

Examples of the antifoaming agent include alcohol-alkylene oxide adducts, fatty acid-alkylene oxide adducts, polypropylene glycols, fatty acid soaps, and silicon compounds. Among them, preferred are silicon compounds. The antifoaming agent is preferably used in an amount of 0.0001 to 0.1% by weight, and more preferably 0.001 to 0.05% by weight to the hydraulic cement material. These ranges are more preferably applied to a cement slurry composition for well.

The cement slurry composition of the present invention can further contain other additives and additive materials, considering an intended use, composition, and the like. Examples of the other additive and the other additive material include a cement accelerator, a low-density additive, a high-density additive, a cement dehydration-reducing agent, a foaming agent, a crack reducing agent, a bubbling agent, an AE agent, a cement expanding agent, a cement strength stabilizer, a silica powder, a silica fume, a fly ash, a limestone powder, a fine aggregate such as ground sand, a coarse aggregate such as crushed stones, and a hollow balloon. These may be used alone or in combination of two or more. In the cases of a cement slurry composition for well, these are preferably added to provide desired properties to the cement slurry for well according to well circumstances (e.g., conditions in the well).

In the rheology modifier for cement slurry of the present invention, the preferred embodiment of the compounds (A) and (B) is described as above. In the rheology modifier for cement slurry of the present invention, the compounds (A) and (B) may be used separately or in a mixed state, and as an aqueous solution or powder. It is also possible to provide a rheology modifier kit containing an agent containing the compound (A) in such amount as satisfying the specified $C_{18}$ rate [hereinafter, referred to as the agent (a)], and an agent containing the compound (B) (hereinafter, referred to as the agent (b)). From the point of workability, a content of the compound (A) in the agent (a) is preferably 5 to 100% by weight. When the agent (a) is a powder, the content is more preferably 70 to 100% by weight, and even more preferably 90 to 100% by weight. When the agent (a) is an aqueous solution, the content is more preferably 10 to 50% by weight, and even more preferably 20 to 40% by weight. A content of the compound (B) in the agent (b) is preferably 5 to 100% by weight. When the agent (b) is a powder, the content is more preferably 70 to 100% by weight, and even more preferably 90 to 100% by weight. When the agent (b) is an aqueous solution, the content is more preferably 10 to 50% by weight, and even more preferably 20 to 40% by weight.

EXAMPLES

The following Examples demonstrate the present invention. Examples are intended to illustrate the present invention and not to limit the present invention.

[1] Preparation of a Cement Slurry Composition for Drilling a Well

Cement slurry compositions for well containing water, cement, and agents (selected from the compound (A), the compound (B) and a dispersant) were prepared as follows. In a 500 mL polypropylene vessel, 400 g of cement was added and 240 g of water in which agents other than the compound (A) were previously dissolved was added. The mixture was kneaded for 30 seconds. To this was added the compound (A) and kneaded for 60 seconds to give a cement slurry composition for well. The cement used was a geothermal well cement manufactured by Ube-Mitsubishi Cement Corporation, and the water used was tap water.

In the composition thus prepared, a water/cement ratio was 60% by weight. Raw materials were previously heated such that a kneaded mixture was at a given temperature shown in Table 2. The compounds (A) and (B) shown in Table 1 were used in combinations and amounts shown in Table 2.

[2] Evaluation (2-1) Viscosity

A viscosity of a composition immediately after preparation was measured with a viscotester VT-04E manufactured by Rion Co., Ltd., using No. 1 rotor or No. 3 rotor for viscosity less than 300 mPa·s.

(2-2) Amount of Free Water

In a 500 mL cup, 600 g of composition was allowed to stand for one hour at a given temperature shown in Table 2. Then a supernatant was collected with a dropper and the amount of free water was measured.

(2-3) Fluidity

When the composition was allowed to stand for one hour for the measurement of the amount of free water, the vessel was inclined by about 45° and fluidity was observed visually at temperatures shown in Table 2 and evaluated on the following three-level scale.

A: flowing
B: hardly flowing
C: not flowing (2-4) Compressive Strength

A composition was injected in a cylindrical mold having a diameter of 5 cm and a height of 10 cm, and hold for 24 hours at a given temperature shown in Table 2. The product was measured with a compression tester.

TABLE 1

| | | | Agent | | | |
|---|---|---|---|---|---|---|
| | | | Compounded component | | | |
| | No. | Compound (A) | $C_{18}$ rate of compound(A) (% by weight) | Compound (B) | (A)/(B) molar ratio | Dispersant |
| Product of the present invention | 1 | Alkyltrimethylammonium chloride [$C_{16}/C_{18}$ = 50/50 (weight ratio)] | 50 | p-toluenesulfonic acid Na salt | 1/1.2 | Dispersant 1 |
| | 2 | Alkyltrimethylammonium chloride [$C_{16}/C_{18}$ = 16/84 (weight ratio)] | 84 | m-xyluenesulfonic acid Na salt | 1.2/1 | Dispersant 1 |
| | 3 | Alkyltrimethylammonium chloride [$C_{18}/C_{22}$ = 100/0 (weight ratio)] | 100 | p-toluenesulfonic acid Na salt | 1/1.2 | Dispersant 1 |
| | 4 | Alkyltrimethylammonium chloride [$C_{18}/C_{22}$ = 11/89 (weight ratio)] | 100 | p-toluenesulfonic acid Na salt | 1/1.2 | Dispersant 1 |
| | 5 | Alkyltrimethylammonium chloride [$C_{18}/C_{22}$ = 0/100 (weight ratio)] | 100 | p-toluenesulfonic acid Na salt | 1/1 | Dispersant 1 |
| Comparative product | 6 | Alkyltrimethylammonium chloride [$C_{16}/C_{18}$ = 100/0 (weight ratio)] | 0 | p-toluenesulfonic acid Na salt | 1/1.2 | Dispersant 1 |
| | 7 | Alkyltrimethylammonium chloride [$C_{16}/C_{18}$ = 60/40 (weight ratio)] | 40 | p-toluenesulfonic acid Na salt | 1/1.2 | Dispersant 1 |
| | 8 | Xanthan gum | — | — | — | Dispersant 2 |

Dispersants 1 and 2 are as follows.
dispersant 1: Kao Corporation, Mighty 3000S
dispersant 2: Kao Corporation, Mighty 150

TABLE 2

| | | Agent | Added amount (weight %) | | | Temperature [° C.] | Viscosity [mPa·s] | Amount of free water [mL] | Fluidity | Compressive strength [mPa·s] after 24 hours |
|---|---|---|---|---|---|---|---|---|---|---|
| | | No. | Compound(A) | Compound(B) | Dispersant | | | | | |
| Example | 1-1 | 1 | 1.14 | 0.80 | 2.67 | 20 | 13000 | 0 | A | — |
| | 1-2 | 1 | 1.14 | 0.80 | 2.67 | 40 | 6000 | 0 | A | 2.0 |
| | 1-3 | 1 | 1.14 | 0.80 | 2.67 | 60 | 1200 | 0 | A | — |
| | 1-4 | 1 | 1.14 | 0.80 | 2.67 | 80 | 300 | 0 | A | 3.1 |
| | 2-1 | 2 | 1.17 | 0.57 | 2.67 | 20 | 10000 | 0 | A | — |
| | 2-2 | 2 | 1.17 | 0.57 | 2.67 | 40 | 11000 | 0 | A | 2.2 |
| | 2-3 | 2 | 1.17 | 0.57 | 2.67 | 60 | 2000 | 13 | A | — |
| | 2-4 | 2 | 1.17 | 0.57 | 2.67 | 80 | 300 | 32 | A | 3.2 |
| | 3-1 | 3 | 1.19 | 0.80 | 2.67 | 20 | 7500 | 0 | A | — |
| | 3-2 | 3 | 1.19 | 0.80 | 2.67 | 40 | 12000 | 0 | A | 2.2 |
| | 3-3 | 3 | 1.19 | 0.80 | 2.67 | 60 | 7000 | 0 | A | — |
| | 3-4 | 3 | 1.19 | 0.80 | 2.67 | 80 | 3500 | 0 | A | 3.3 |
| | 4-1 | 4 | 0.69 | 0.40 | 1.34 | 20 | 300 | 5 | A | — |
| | 4-2 | 4 | 0.69 | 0.40 | 1.34 | 40 | 1700 | 0 | A | 1.9 |
| | 4-3 | 4 | 0.69 | 0.40 | 1.34 | 60 | 4700 | 0 | A | — |
| | 4-4 | 4 | 0.69 | 0.40 | 1.34 | 80 | 5000 | 0 | A | 3.2 |
| | 4-5 | 4 | 1.38 | 0.80 | 2.67 | 20 | 1100 | 0 | A | — |
| | 4-6 | 4 | 1.38 | 0.80 | 2.67 | 40 | 3500 | 0 | A | 2.0 |
| | 4-7 | 4 | 1.38 | 0.80 | 2.67 | 60 | 8500 | 0 | A | — |
| | 4-8 | 4 | 1.38 | 0.80 | 2.67 | 80 | 7000 | 0 | A | 3.1 |
| | 5-1 | 5 | 1.43 | 0.67 | 2.67 | 20 | 4800 | 0 | A | — |
| | 5-2 | 5 | 1.43 | 0.67 | 2.67 | 40 | 6500 | 0 | A | 2.1 |
| | 5-3 | 5 | 1.43 | 0.67 | 2.67 | 60 | 10000 | 0 | A | — |
| | 5-4 | 5 | 1.43 | 0.67 | 2.67 | 80 | 10000 | 0 | A | 3.0 |

TABLE 2-continued

|  |  | Agent No. | Added amount (weight %) | | | Temperature [° C.] | Viscosity [mPa·s] | Amount of free water [mL] | Fluidity | Compressive strength [mPa·s] after 24 hours |
|---|---|---|---|---|---|---|---|---|---|---|
|  |  |  | Compound(A) | Compound(B) | Dispersant |  |  |  |  |  |
| Comparative Example | 6-1 | None | — | — | — | 20 | 350 | 23 | B | — |
|  | 6-2 | None | — | — | — | 40 | 380 | 24 | B | 3.4 |
|  | 6-3 | None | — | — | — | 60 | 650 | 26 | C | — |
|  | 6-4 | None | — | — | — | 80 | 650 | 29 | C | 7.3 |
|  | 7-1 | 6 | 1.13 | 0.80 | 2.67 | 20 | 10000 | 0 | A | — |
|  | 7-2 | 6 | 1.13 | 0.80 | 2.67 | 40 | 280 | 53 | A | 2.0 |
|  | 7-3 | 6 | 1.13 | 0.80 | 2.67 | 60 | 180 | 66 | A | — |
|  | 7-4 | 6 | 1.13 | 0.80 | 2.67 | 80 | 150 | 70 | A | 3.2 |
|  | 8-1 | 7 | 0.44 | 0.30 | 1.00 | 20 | 4600 | 0 | A | — |
|  | 8-2 | 7 | 0.44 | 0.30 | 1.00 | 40 | 190 | 0 | A | 2.1 |
|  | 8-3 | 7 | 0.44 | 0.30 | 1.00 | 60 | 150 | 41 | A | — |
|  | 8-4 | 7 | 0.44 | 0.30 | 1.00 | 80 | 100 | 63 | A | 3.2 |
|  | 8-5 | 7 | 1.17 | 0.80 | 2.67 | 20 | 15000 | 0 | A | — |
|  | 8-6 | 7 | 1.17 | 0.80 | 2.67 | 40 | 2000 | 0 | A | 1.9 |
|  | 8-7 | 7 | 1.17 | 0.80 | 2.67 | 60 | 250 | 28 | A | — |
|  | 8-8 | 7 | 1.17 | 0.80 | 2.67 | 80 | 200 | 40 | A | 3.3 |
|  | 9-1 | 8 | 3.00 | — | 1.25 | 20 | 3200 | 0 | B | — |
|  | 9-2 | 8 | 3.00 | — | 1.25 | 40 | 1000 | 1 | C | Unhardened |
|  | 9-3 | 8 | 3.00 | — | 1.25 | 60 | 900 | 3 | C | — |
|  | 9-4 | 8 | 3.00 | — | 1.25 | 80 | 1300 | 4 | C | Unhardened |

Added amounts of the compounds (A) and (B) are amounts (% by weight) of effective components in an aqueous phase of a slurry. An added amount of a dispersant is an apparent amount (% by weight) in an aqueous phase of a slurry.

The invention claimed is:

1. A cement slurry composition, comprising a hydraulic cement material, (A) a first water-soluble, low molecular weight compound and (B) a second water-soluble low molecular weight compound differing from the compound (A),
wherein a combination of the compounds (A) and (B) is (I) the compound (A) selected from cationic surfactants and the compound (B) selected from anionic aromatic compounds; or (II) the compound (A) selected from cationic surfactants and the compound (B) selected from brominated compounds, and
in the compound (A), a ratio of compounds having a hydrocarbon group of 18 or more carbon atoms is not less than 45% by weight and, in above-mentioned compound (A), a ratio of compounds having a hydrocarbon group 22 or more carbon atoms is not less than 40% by weight.

2. The cement slurry composition according to claim 1, which is for a well.

3. A method of cementing a well by using a cement slurry composition as a cement slurry composition for filling and fixing an annular cavity between a stratum and a casing pipe with a cement material in drilling a well, wherein the cement slurry composition comprises a hydraulic cement material, (A) a first water-soluble, low molecular weight compound and (B) a second water-soluble low molecular weight compound differing from the compound (A),
a combination of the compounds (A) and (B) is (I) the compound (A) selected from cationic surfactants and the compound (B) selected from anionic aromatic compounds; or (II) the compound (A) selected from cationic surfactants and the compound (B) selected from brominated compounds, and
in the compound (A), a ratio of compounds having a hydrocarbon group of 18 or more carbon atoms is not less than 45% by weight and, in above-mentioned compound (A), a ratio of compounds having a hydrocarbon group 22 or more carbon atoms is not less than 40% by weight.

4. The method according to claim 3, wherein the cement slurry composition further comprises a dispersant.

5. A rheology modifier for cement slurry, comprising (A) a first water-soluble low molecular weight compound and (B) a second water-soluble low molecular weight compound differing from the compound (A),
wherein a combination of the compounds (A) and (B) is (I) the compound (A) selected from cationic surfactants and the compound (B) selected from anionic aromatic compounds; or (II) the compound (A) selected from cationic surfactants and the compound (B) selected from brominated compounds, and
in the compound (A), a ratio of compounds having a hydrocarbon group of 18 or more carbon atoms is not less than 45% by weight and, in above-mentioned compound (A), a ratio of compounds having a hydrocarbon group 22 or more carbon atoms is not less than 40% by weight.

6. The method according to claim 3, wherein compound (A) is an alkyltrimethylammonium salt having 16 to 26 carbon atoms in the alkyl.

7. The method according to claim 3, wherein compound (A) is an alkyltrimethylammonium salt having 18 to 24 carbon atoms in the alkyl.

8. The method according to claim 3, wherein compound (A) is selected from the group consisting of alkyltrimethylammonium chloride [C16/C18=50/50 (weight ratio)], alkyltrimethylammonium chloride [C16/C18=16/84 (weight ratio)], alkyltrimethylammonium chloride [C18/C22=100/0 (weight ratio)], alkyltrimethylammonium chloride [C18/C22=11/89 (weight ratio)] and alkyltrimethylammonium chloride [C18/C22=0/100 (weight ratio)].

9. The method according to claim 3, wherein compound (B) is selected from the group consisting of carboxylic acids and salts thereof, phosphonic acids and salts thereof, and sulfonic acids and salts thereof, which have an aromatic ring.

10. The method according to claim 3, wherein compound (B) is selected from the group consisting of salicylic acid, p-toluenesulfonic acid, sulfosalicylic acid, benzoic acid, m-sulfobenzoic acid, p-sulfobenzoic acid, 4-sulfophthalic acid, 5-sulfoisophthalic acid, p-phenolsulfonic acid, m-xylene-4-sulfonic acid, cumenesulfonic acid, methylsalicylic acid, styrenesulfonic acid and chlorobenzoic acid.

11. The method according to claim 3, wherein the combination (I) is compound (A) selected from the group consisting of an alkyl having 10 to 26 carbon atoms-trimethylammonium salt (where a $C_{18}$ rate is not less than 45% by weight) and compound (B) selected from the group consisting of a salt of sulfonic acid having an aromatic ring.

12. The method according to claim 3, wherein compound (B) is selected from the group consisting of p-toluenesulfonic acid and m-xylenesulfonic acid or a salt thereof.

13. The method according to claim 3, wherein the molar ratio of the compound (A) to the compound (B) is from 1/20 to 20/1.

14. The method according to claim 3, wherein the molar ratio of the compound (A) to the compound (B) is from 1/3 to 2/1.

15. The method according to claim 3, wherein the molar ratio of the compound (A) to the compound (B) is from 1/1 to 2/3.

16. The method according to claim 3, wherein the $C_{18}$ rate of compound (A) is not less than 60% by weight.

17. The method according to claim 3, wherein the $C_{18}$ rate of compound (A) is not less than 70% by weight.

18. The method according to claim 3, wherein the cement slurry composition has a viscosity at 60° C. of 500 to 10000 mPa·s.

19. The method according to claim 3, wherein the cement slurry composition has a viscosity at 60° C. of 1000 to 10000 mPa·s.

20. The method according to claim 9, wherein the cement slurry composition has a water/cement ratio (W/C) of 40 to 130% by weight.

* * * * *